US012696155B2

(12) United States Patent
Kim

(10) Patent No.: US 12,696,155 B2
(45) Date of Patent: Jul. 28, 2026

(54) METHOD AND APPARATUS FOR IMPROVING COVERAGE IN WIRELESS COMMUNICATION SYSTEM

(71) Applicant: Samsung Electronics Co., Ltd., Gyeonggi-do (KR)

(72) Inventor: Donggun Kim, Middlesex (GB)

(73) Assignee: Samsung Electronics Co., Ltd. (KR)

( * ) Notice: Subject to any disclaimer, the term of this patent is extended or adjusted under 35 U.S.C. 154(b) by 298 days.

(21) Appl. No.: 18/392,423

(22) Filed: Dec. 21, 2023

(65) Prior Publication Data

US 2024/0214891 A1     Jun. 27, 2024

(30) Foreign Application Priority Data

Dec. 21, 2022    (GB) ....................................... 2219401
Nov. 21, 2023    (GB) ....................................... 2317815

(51) Int. Cl.
| | |
|---|---|
| *H04W 12/106* | (2021.01) |
| *H04W 12/08* | (2021.01) |
| *H04W 36/00* | (2009.01) |
| *H04W 36/08* | (2009.01) |

(52) U.S. Cl.
CPC ........... *H04W 36/08* (2013.01); *H04W 12/08* (2013.01); *H04W 12/106* (2021.01); *H04W 36/0038* (2013.01)

(58) Field of Classification Search
None
See application file for complete search history.

(56) References Cited

U.S. PATENT DOCUMENTS

| | | | | |
|---|---|---|---|---|
| 2021/0099954 A1* | 4/2021 | Agiwal | ............. | H04W 52/0229 |
| 2022/0225453 A1* | 7/2022 | Kim | ....................... | H04W 76/20 |
| 2022/0322418 A1* | 10/2022 | Kim | ....................... | H04W 28/18 |

FOREIGN PATENT DOCUMENTS

WO    WO 2024/010315    1/2024

OTHER PUBLICATIONS

MediaTek Inc., "38.300 Running CR for Introduction of NR Further Mobility Enhancements", R2-2213292, 3GPP TSG-RAN WG2 Meeting #120, Nov. 14-18, 2022, 15 pages.
British Search Examination Report dated May 17, 2024 issued in counterpart application No. 2317815.5, 6 pages.

* cited by examiner

*Primary Examiner* — Idowu O Osifade
(74) *Attorney, Agent, or Firm* — The Farrell Law Firm, P.C.

(57)            ABSTRACT

The present disclosure relates to a 5G communication system or a 6G communication system for supporting higher data rates beyond a 4G communication system such as long term evolution (LTE). A method performed by a user equipment (UE) in a wireless communication system includes receiving a medium access control (MAC) protocol data unit (PDU) including a MAC control element (CE) indicating at least one target cell configuration and performing a primary cell (PCell) change to a target cell based on the at least one target cell configuration.

20 Claims, 16 Drawing Sheets

■ User Plane Protocol Stack—102

| 105 UE | | 110 gNB |

150 User plane data

SDAP: Service Data Adaptation Protocol
PDCP: Packet Data Convergence Protocol
RLC:　Radio Link Control
MAC:　Medium Access Control

FIG. 4

2 bytes    2 bytes    2 bytes                    X bytes                          4 bytes RRCReconfiguration MAC        RLC        PDCP                         520                            MAC-I
header     header     header 505        510        515                                                         525

METHOD AND APPARATUS FOR IMPROVING COVERAGE IN WIRELESS COMMUNICATION SYSTEM

CROSS-REFERENCE TO RELATED APPLICATIONS

This application is based on and claims priority under 35 U.S.C. § 119 to GB Patent Application Nos. 2219401.3 and 2317815.5, which were filed on Dec. 21, 2022, and Nov. 21, 2023, respectively, in the United Kingdom Intellectual Property Office (UKIPO), the disclosure of each of which is incorporated herein by reference in its entirety.

BACKGROUND

1. Field

The disclosure relates generally to a wireless communication system, and more particularly, to an apparatus, a method and a system for improving coverage in a wireless communication system.

2. Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100μsec, and thus will be 50 times as fast as 5G communication systems and have the ¹/₁₀ radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

Many factors including messaging can impact coverage for control messages in technologies such as radio resource control (RRC) messages and medium access control layer control elements (MAC CEs) exchanged between a user equipment (UE) and a base station (BS or gNB, for example) of the network.

In a radio access network (RAN) which refers to the part of a telecommunication network that interfaces directly with UEs, one of the main determinants of coverage is the size of the bitstream transmitted from the UE to the network.

However, the size of control messages such as RRCSetupRequest and RRCResumeRequest is limited, in the conventional art, to a certain size (e.g. 48 bits or 56 bits) since this has an impact on coverage.

Further, it is difficult to optimize the size of RRCSetupRequest and RRCResumeRequest because either is the first RRC message from the UE side before RRC connection and already has a limited size due to the aforementioned coverage issue.

Therefore, there is a need in the art for a method and apparatus for improved techniques to reduce the size of RRC messaging so as to improve the coverage in the wireless communication system.

SUMMARY

This disclosure has been made to address at least the above-mentioned problems and/or disadvantages and to provide at least the advantages described below.

Accordingly, an aspect of the disclosure is to provide a method and apparatus for improved coverage in a wireless communication system by better addressing the typical problems that are experienced with coverage, such as by reducing the size of control messages.

In accordance with an aspect of the present disclosure, a method performed by a UE in a wireless communication system includes receiving a medium access control (MAC) protocol data unit (PDU) including a MAC control element (CE), the MAC CE indicating at least one target cell configuration, and performing a primary cell (PCell) change to a target cell based on the at least one target cell configuration.

In accordance with an aspect of the present disclosure, a method performed by a BS in a wireless communication system includes generating a MAC PDU including a MAC CE, the MAC CE indicating at least one target cell configuration, and transmitting the MAC PDU including the MAC CE. The at least one target cell configuration is associated with a target cell to which a PCell change is performed.

In accordance with an aspect of the present disclosure, a UE in a wireless communication system includes a transceiver, and a controller configured to receive, via the transceiver, a MAC PDU including a MAC CE, the MAC CE indicating at least one target cell configuration, and perform a PCell change to a target cell based on the at least one target cell configuration.

In accordance with an aspect of the present disclosure, a BS in a wireless communication system includes a transceiver, and a controller configured to generate a MAC PDU including a MAC CE, the MAC CE indicating at least one target cell configuration, and transmit, via the transceiver, the MAC PDU including the MAC CE. The at least one target cell configuration is associated with a PCell change to a target cell.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates a configuration of SRB1 according to an embodiment;

DETAILED DESCRIPTION

The following description with reference to the accompanying drawings is provided to assist in a comprehensive understanding of various embodiments of the disclosure. It includes various specific details to assist in that understanding but these are to be regarded as examples. Accordingly, those of ordinary skill in the art will recognize that various changes and modifications of the various embodiments described herein can be made without departing from the scope of the disclosure. Descriptions of well-known functions and constructions may be omitted for the sake of clarity and conciseness.

Terms and words used in the following description are not limited to the bibliographical meanings, but are merely used by the inventor to enable a clear and consistent understanding of the disclosure. Accordingly, it should be apparent to those skilled in the art that the following description of embodiments of the disclosure is provided for illustration purposes only and not to limit the disclosure.

It is to be understood that the singular forms "a," "an," and "the" include plural referents unless the context clearly dictates otherwise. Thus, reference to a component surface includes reference to one or more of such surfaces.

The term substantially indicates that the recited characteristic, parameter, or value need not be achieved exactly, but that deviations or variations, such as tolerances, measurement error, measurement accuracy limitations and other factors known to those of skill in the art, may occur in amounts that do not preclude the effect the intended characteristic.

In this description, terms such as a unit, module or the like may refer to a software component or hardware component, such as a field-programmable gate array (FPGA) or an application-specific integrated circuit (ASIC) capable of carrying out a function or an operation. However, a unit is not limited to hardware or software, and may be configured to reside in an addressable storage medium or to drive one or more processors. Units, or the like, may refer to software components, object-oriented software components, class components, tasks, components, processes, functions, attributes, procedures, subroutines, program code segments, drivers, firmware, microcode, circuits, data, databases, data structures, tables, arrays or variables. A function provided by a component and unit may be a combination of fewer components and units and may be combined with others to compose larger components and units. Components and units may be configured to drive a device or one or more processors in a secure multimedia card.

Herein, a BS is an entity communicating with a UE and may also be referred to as a base transceiver station (BTS), node B (NB), evolved NB (eNB), access point (AP), or a 5G NB (5GNB).

The UE is an entity communicating with a BS and may also be referred to as a device, mobile station (MS), mobile equipment (ME), or terminal.

Figure 1A:
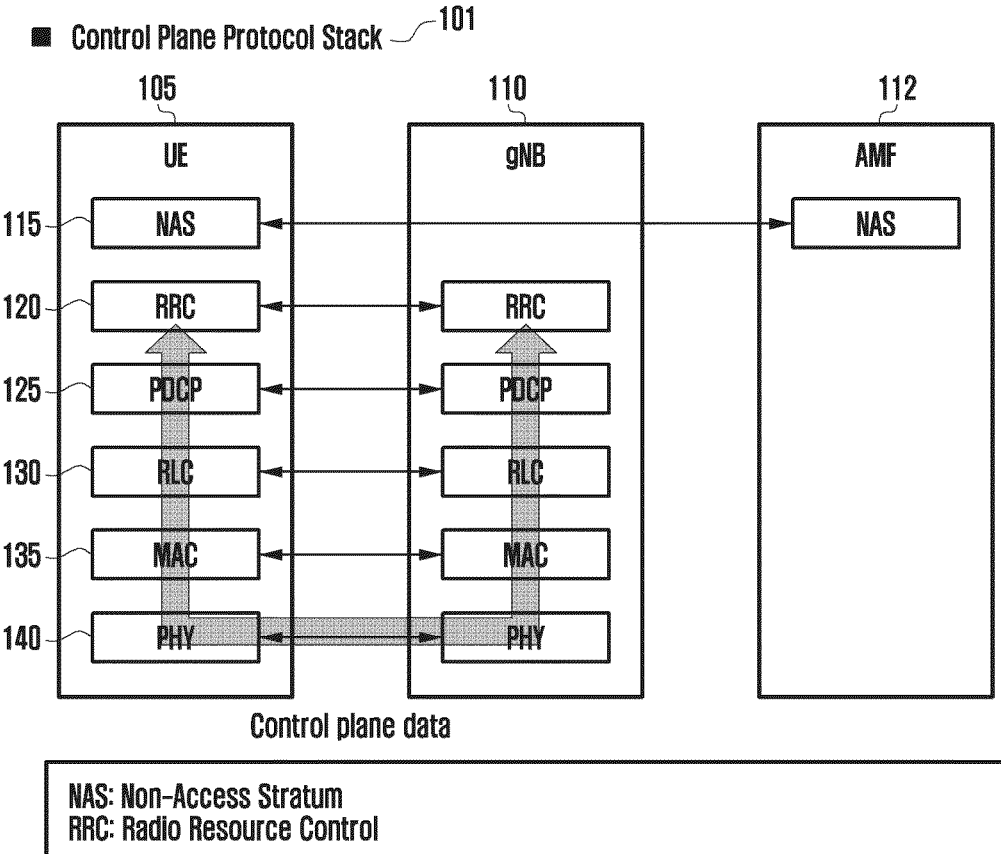
FIG. 1A illustrates control plane protocol stack according to an embodiment.

FIG. 1A illustrates a control plane protocol stack 101 according to an embodiment.

Figure 1B:
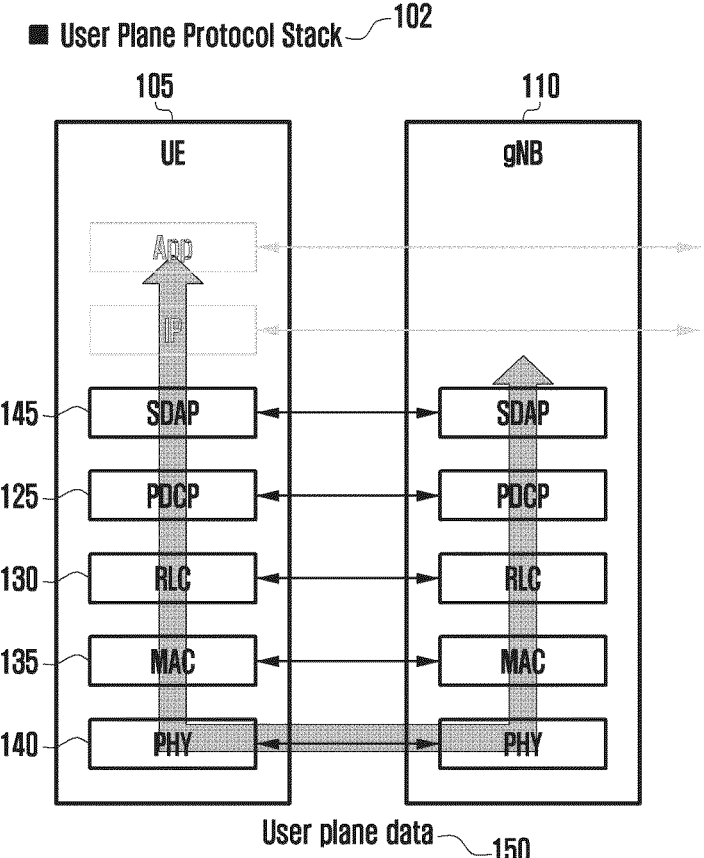
FIG. 1B illustrates user plane protocol stack according to an embodiment.

FIG. 1B illustrates a user plane protocol stack 102 according to an embodiment.

Referring to FIG. 1A, the control plane radio protocol stack 101 of the 5G mobile communication system includes a non-access stratum (NAS) control protocol 115, RRC 120, a packet data convergence protocol (PDCP) 125, radio link control (RLC) 130, medium access control (MAC) 135 sublayers, and physical (PHY) 140 layers in a UE or a BS. Referring to FIG. 1B, the user plane radio protocol stack 102 of the 5G mobile communication system also includes the PDCP 125, RLC 130, MAC 135 sublayers, and PHY 140 layers as in FIG. 1A, and further includes a service data adaptation protocol (SDAP) 145 in a UE or a BS.

In FIG. 1A, the NAS 115 control protocol is terminated in core network entity (e.g., access and mobility management function (AMF) 112 on the network side) and performs the functions including authentication, mobility management, and security control.

The main functions of the RRC 120 sublayer may include broadcast of system information related to access stratum (AS) and NAS 115, paging initiated by 5GC or NGRAN, establishment, maintenance and release of an RRC 120 connection between the UE 105 and NGRAN including addition, modification and release of carrier aggregation and/or addition, modification and release of dual connectivity in NR or between an evolved universal terrestrial radio access (EUTRA) and NR, security functions including key management, establishment, configuration, maintenance and release of signalling radio bearers (SRBs) and data radio bearers (DRBs), mobility functions including handover and context transfer, UE cell selection and reselection and control of cell selection and reselection, and/or inter-radio access technology (RAT) mobility, quality of service (QoS) management functions, UE measurement reporting and control of the reporting, detection of and recovery from radio link failure, and NAS message transfer to/from NAS from/to UE.

In FIG. 1B, the main functions of the SDAP 145 may include transfer of user plane data 150, mapping between a QoS flow and a data bearer (DRB) for both the UL and DL, marking a QoS flow identifier (ID) in both DL and UL packets, and mapping a reflective QoS flow to a DRB for UL SDAP PDUs (reflective QoS flow to DRB mapping for the UL SDAP PDUs).

As to the SDAP 145 layer device in FIG. 1B, the UE 105 may be configured with, through an RRC message, whether to use the header of the SDAP layer device or the function of the SDAP layer device for each PDCP layer device, for each bearer, or for each logical channel. When the SDAP header is configured, the UE 105 may indicate to update or reconfigure mapping information for UL and DL QoS flows and data bearers by using a NAS QoS reflective setting 1-bit indicator (NAS reflective QoS) and an AS QoS reflective setting 1-bit indicator (AS reflective QoS) of the SDAP header. The SDAP header may include QoS flow ID information indicating QoS. The QoS information may be used as data processing priority and scheduling information to support a smooth service.

The main functions of the PDCP 125 may include header compression and decompression in robust header compression (ROHC) only, transfer of user data, in-sequence delivery of upper layer PDUs, out-of-sequence delivery of upper layer PDUs, sequence reordering (PDCP PDU reordering for reception), duplicate detection of lower layer SDUs, retransmission of PDCP SDUs, ciphering and deciphering, and timer-based SDU discard in the UL.

The reordering function of the PDCP device may include sequentially reordering PDCP PDUs, received from a lower layer, based on a PDCP sequence number (SN), and transmitting data to an upper layer in the reordered sequence. Alternatively, the reordering function of the PDCP device may include directly transmitting data to an upper layer without considering the sequence, reordering the sequence and recording lost PDCP PDUs, providing a state report on the lost PDCP PDUs to a transmission side, and requesting retransmission of the lost PDCP PDUs.

The main functions of the RLC 130 may include transfer of upper layer PDUs, in-sequence delivery of upper layer PDUs, out-of-sequence delivery of upper layer PDUs, error correction through automatic repeat request (ARQ), concatenation, segmentation and reassembly of RLC SDUs, re-segmentation of RLC data PDUs, reordering of RLC data PDUs, duplicate detection, protocol error detection, RLC SDU discard, and RLC re-establishment.

The in-sequence delivery (or ID) function of the RLC device refers to transmitting RLC SDUs, received from a lower layer, to an upper layer in sequence. The in-sequence delivery function of the RLC device may include, when one RLC SDU is originally segmented into multiple RLC SDUs and received, reassembling and transmitting the multiple RLC SDUs, reordering the received RLC PDUs based on an RLC SN or PDCP SN, reordering the sequence and recording lost RLC PDUs, providing a state report on the lost RLC PDUs to a transmission side, requesting retransmission of the lost RLC PDUs, sequentially transmitting only RLC SDUs prior to the lost RLC SDU to an upper layer when there is a lost RLC SDU, sequentially transmitting all the RLC SDUs received before a predetermined timer starts to an upper layer when the predetermined timer has expired even if there is a lost RLC SDU, or sequentially transmitting all received RLC SDUs to an upper layer when the predetermined timer has expired even when there is a lost RLC SDU. The RLC PDUs may be processed in a sequence in which the RLC PDUs are received (a sequence number, regardless of the sequence of sequence numbers, or in a sequence of arrival), and may be transmitted to a PDCP device in out-of-sequence delivery. The function may include receiving segments stored in a buffer or segments to be received later, reconfiguring the segments in one complete RLC PDU, processing the RLC PDU, and transmitting the RLC PDU to the PDCP device. The RLC layer may not include a concatenation function, and the concatenation function may be performed by the MAC layer or may be replaced by a multiplexing function of the MAC layer.

The out-of-sequence delivery function of the RLC device may include directly transmitting the RLC SDUs, received from the lower layer, to an upper layer regardless of the sequence thereof. The out-of-sequence delivery function of the RLC device may include, when one RLC SDU has been originally segmented into multiple RLC SDUs and received, reassembling the multiple RLC SDUs and transmitting the same, and storing the RLC SN or PDCP SN of the received RLC PDUs, ordering the sequence, and recording the lost RLC PDUs.

The MAC 135 layer may be connected to multiple RLC layer devices configured in one UE, and the main function of the MAC may include mapping between logical channels and transport channels, multiplexing/de-multiplexing of MAC SDUs, scheduling information reporting, error correction through hybrid ARQ (HARQ), priority handling between logical channels of one UE, priority handling between UEs by means of dynamic scheduling, multimedia broadcast multicast service (MBMS) identification, transport format selection, and padding.

The PHY 140 layers may perform operations of channel-coding and modulating upper layer data, forming the upper layer data into an OFDM symbol, transmitting the OFDM symbols via a radio channel or demodulating and channel decoding of the OFDM symbols received via the radio channel, and transferring the OFDM symbol to an upper layer.

The gNB 110 may include central unit and distributed unit (CU-DU) split architecture where the gNB-CU is a logical node hosting RRC 120 (in FIG. 1A), SDAP 145 (in FIG. 1B) and PDCP 125 protocols of the gNB 110 or RRC 120 (in FIG. 1A) and PDCP 125 protocols of the gNB 110 that controls the operation of a gNB distributed unit (gNB-DU) being a logical node hosting RLC 130, MAC 135 and PHY 140 layers of the gNB 110. Operation of the gNB 110 is partly controlled by a gNB-CU, which may terminate the F1 interface connected with the gNB-DU. One gNB-DU may support one or multiple cells. One cell may be supported by only one gNB-DU. The gNB-DU may terminate the F1 interface connected with the gNB-CU. For dual connectivity (DC) operation, the master gNB-DU may designate the gNB-DU of an gNB or a gNB acting as master node, and the Secondary gNB-DU may designate the gNB-DU of an gNB or a gNB acting as secondary node.

Figure 2:
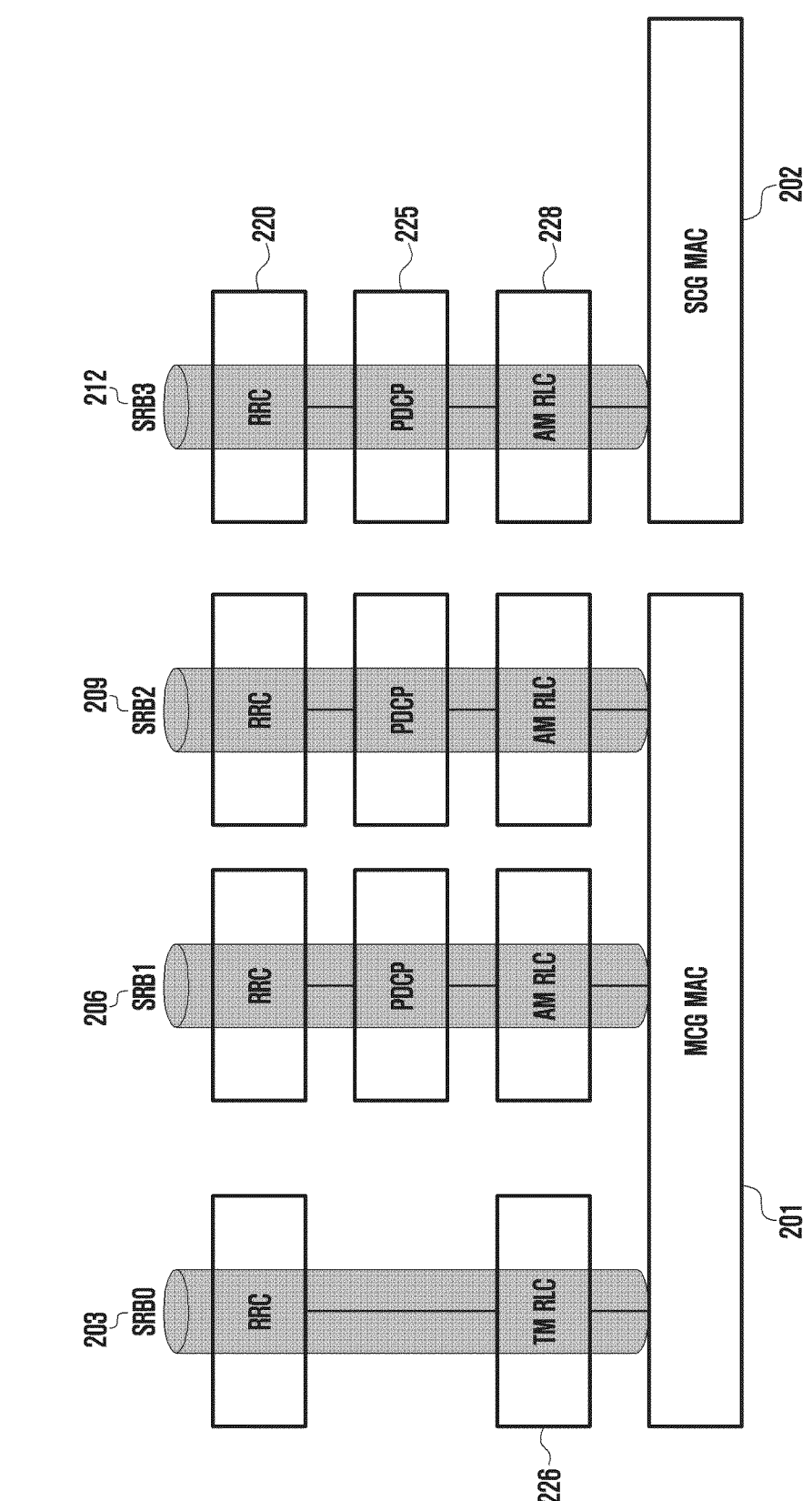
FIG. 2 illustrates a signalling radio bearer (SRB) configuration according to an embodiment.

FIG. 2 illustrates a signalling radio bearer (SRB) configuration according to an embodiment. In FIG. 2, SRBs are used for control plane data transmission and reception in a master cell group (MCG) MAC 201 and a secondary cell group (SCG) MAC 202.

In FIG. 2, there are a plurality of SRBs in use, including SRB0 203, which is used for a common control channel (CCCH), i.e., when to set up an RRC connection with the network, SRB1 206, which is used for most RRC 220 messages after RRC connection, SRB2 209, which is used to transport low priority NAS messages, and SRB3 212, which is used to transport an SCG RRC message between the SCG and UE.

Note that PDCP 225 headers and RLC headers are not attached to data via SRB0 203, but are attached to data via other SRBs. The transparent mode (TM) RLC 226 is one RLC entity, and the acknowledged mode (AM) RLC 228 is another RLC entity. TM mode does not require any RLC entity processing, including RLC header generation.

As mentioned above, the PDCP 225 header and AM RLC 228 header are attached to data via SRB1 206, SRB2 209, and SRB3 212.

A MAC header is attached to data via all SRBs by adding a logical channel ID (LCID) corresponding to the logical channel of each SRB.

A MAC CE is a control message, which can be transmitted and received from/to MAC layers of UE or gNB, and processed in MAC layer. In general, the MAC CE is not processed through RLC, PDCP, and RRC layers.

The size of the bitstream is of importance when determining RAN coverage. The first RRC message between the UE and the network is one of RRCSetupRequest and RRCResumeRequest. RRCSetupRequest is transmitted from the UE when the UE transits from RRC IDLE mode to RRC CONNECTED mode. RRCResumeRequest is transmitted from the UE when the UE transits from RRC INACTIVE to RRC CONNECTED mode.

The smaller the size of the control message, the larger the coverage. It is therefore desirable to minimise as much as possible the size of the control message. Any reduction in the size of the control message translates into increased coverage. Accordingly, the disclosure aims to reduce the size of control messages in such situations. A control message herein indicates an RRC message or MAC CE. As the size of RRC message is greater than the size of MAC CE, to the disclosure will address reduction of the size of RRC message, followed by the replacement of a large RRC message with a small MAC CE.

The first RRC message (message 3) is transmitted via SRB0 203 and only a MAC header is attached to the RRC messages. Problems or issues with coverage can be experienced due to the UE initially setting up the RRC connection with a network, the UE performing handover (i.e. PCell change for MCG or PSCell change for SCG) to another cell, e.g. intra-gNB handover to another cell of the same gNB, intra-DU handover to another cell belonging to the same DU, inter-gNB handover to a cell of a different gNB, or inter-DU handover to a cell belonging to the different DU, which can be applied to MCG or SCG, the UE performing SCG addition or PSCell change or intra-SCG to another cell of the same SCG or inter-SCG change to a cell of the different SCG, and the UE performing RRC re-establishment. Such RRC re-establishment causes may include at least one of detecting radio link failure of the MCG and t316 (timer) is not configured, detecting radio link failure of the MCG while SCG transmission is suspended, detecting radio link failure of the MCG while PSCell change or PSCell addition is ongoing, detecting radio link failure of the MCG while the SCG is deactivated, re-configuration with sync failure of the MCG, mobility from NR failure, integrity check failure indication from lower layers concerning SRB1 or SRB2, except if the integrity check failure is detected on the RRCReestablishment message, an RRC connection reconfiguration failure, detecting radio link failure for the SCG while MCG transmission is suspended in NR-DC or in NE-DC, reconfiguration with sync failure of the SCG while MCG transmission is suspended, SCG change failure while MCG transmission is suspended, SCG configuration failure while MCG transmission is suspended in NR-DC or in NE-DC, integrity check failure indication from SCG lower layers concerning SRB3 while MCG is suspended, or T316 expiry.

Herein, there is provided a method of performing a PCell change by a transmitting device, configured with at least one target cell configuration in a wireless communication system, including receiving a MAC CE indicating the at least one target cell configuration, performing a PCell change execution to the target cell by applying the at least one target cell configuration, and sending RRCReconfigurationComplete to the at least one target cell.

The transmitting device is a UE, and control messages are transmitted via SRB1.

The network provides a plurality of SRB configurations for the transmitting device, said plurality of configurations including an SRB with AM RLC entity configuration; an SRB with TM RLC entity configuration for RRC message transmission with reduced overhead; an SRB with UM (unacknowledged mode) RLC entity configuration for RRC message transmission with reduced latency; an SRB with two AM RLC entities, where one AM RLC entity for a cell and the other AM RLC entity for another cell (i.e. split SRB for carrier aggregation (CA), which can be used for packet duplication to enhance the reliability; an SRB with two AM RLC entities, where one AM RLC entity for the MCG MAC cell and the other AM RLC entity for the SCG MAC cell (i.e. split SRB for DC; an SRB with two RLC entities, where one AM RLC entity for reliable transmission and the UM RLC entity for RRC message transmission with reduced latency; and an SRB with two RLC entities, where one AM RLC entity for reliable transmission and the TM RLC entity for RRC message transmission with reduced overhead (i.e. split SRB for coverage enhancement with overhead reduction).

A source cell determines whether a transmitting device has capability relating to a fourth MAC PDU by means of UE information request and UE information response.

The source cell determines whether the target cell has capability relating to the Fourth MAC PDU via Xn message.

Figure 3:
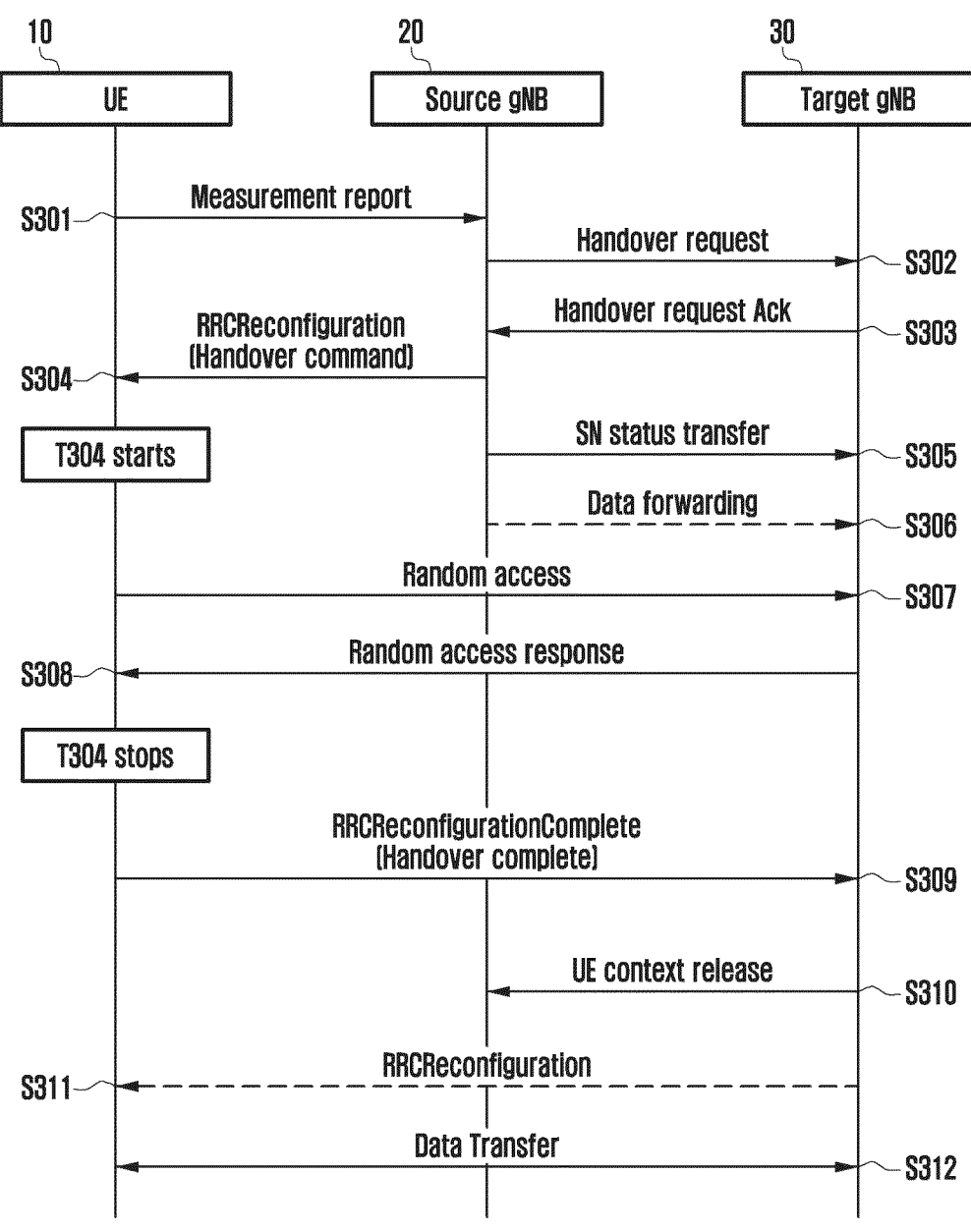
FIG. 3 illustrates a message exchange according to an embodiment.

FIG. 3 illustrates a message exchange according to an embodiment.

Multiple cases having one or more RRC messages and a MAC CE associated therewith are now considered.

Case 0 refers to when the UE is initially setting up the RRC connection with network, by RRCSetupRequest and RRCResumeRequest.

Case 1-1 refers to when the UE performs handover to another cell (i.e. PCell change), e.g. intra-gNB handover (Handover to another cell of the same gNB or base-station) or intra-DU handover (Handover to another cell belonging to the same DU) or Inter-gNB handover (Handover to a cell of different gNB or base-station) or inter-DU handover (Handover to a cell belonging to the different DU), which can be applied to MCG or SCG, by RRCReconfiguration and RRCReconfigurationComplete.

Case 1-2 refers to when the UE performs handover to another cell (i.e. PCell change), e.g. intra-gNB handover (Handover to another cell of the same gNB or base-station) or intra-DU handover (Handover to another cell belonging to the same DU) or Inter-gNB handover (Handover to a cell of different gNB or base-station) or inter-DU handover (Handover to a cell belonging to the different DU), which can be applied to MCG or SCG; A MAC CE with an identity indicating a target cell (or a target cell configuration), instead of RRCReconfiguration and RRCReconfigurationComplete.

Case 2 refers to when the UE performs SCG change (or PSCell change) or SCG addition (or PSCell addition), or intra-SCG change or inter-SCG change, by RRCReconfiguration and RRCReconfigurationComplete.

Case 3 refers to when the UE performs RRC Re-establishment according to one of many RRC Re-establishment causes, by RRCReestablishmentRequest, RRCReestablishment, and RRCReestablishmentComplete.

Case 4 refers to when the UE performs a Conditional handover, RRCReconfiguration, RRCReconfigurationComplete to the source cell, and RRCReconfigurationComplete to the target cell.

Newly defined RRC messages may be created for any of the cases above (i.e. Case 0, 1, 2, 3, and 4).

If the RRC message can be reduced, then coverage can be correspondingly increased. If the size of RRC messages can be reduced, the network coverage can be enhanced.

In the disclosure, the configuration restriction is lifted and new parameters, rules and procedures are introduced herein, thereby enabling RRC messages to be reduced in size for the foregoing cases.

In FIG. 3, the following relates to Case 1-1, PCell change or Handover. The message exchange between the UE 10, the source gNB 20 and target gNB 30 is shown in FIG. 3. The target gNB 30 can be interpreted as a target cell, i.e., for intra-gNB handover or intra-DU handover, and indicates the target cell belonging to the same gNB (or DU) as the source gNB is the target gNB.

The handover is triggered by the network. Based on the UE's measurement report (S301), the source gNB 20 looks for a suitable cell and then sends a handover request message (S302) to target gNB 30 for approval.

When the target gNB 30 approves the request, the target gNB 30 generates a handover request acknowledgement (ACK) message (S303) including a RRCReconfiguration message and sends it to the source gNB 20.

The source gNB 20 (or cell) sends the RRCReconfiguration message (S304) to UE 10 as a handover command, which includes reconfigurationWithsync indicator indicating PCell change (i.e. handover). When the UE 10 receives the RRCReconfiguration message, the UE 10 starts T304 timer and initiates a handover to the target cell. T304 stops when the random access procedure toward the target cell is successfully completed. The handover is considered as failed upon the expiry of the T304 timer.

The source gNB 20 transfers an SN status to the target gNB 30, which enables the target gNB 30 to reorder the received data in order and check the missing data, based on sequence number (e.g. PDCP sequence number or COUNT value) (S305). The source gNB 20 can forward the data to the target gNB 30, which has not been transmitted to UE (S306).

The UE 10 may initiate a random access procedure (S307) by transmitting a random access preamble to the target gNB 30 (or cell). The UE 10 may receive a random access response (S308) corresponding to the random access preamble, The UE 10 may transmit an RRCReconfigurationComplete (S309) to the target gNB 30.

When the UE 10 successfully completes the random access procedure (i.e. the target gNB 30 receives the RRCReconfigurationComplete message), the UE 10 and the target gNB 30 considers the handover as successfully completed and indicates the source gNB 20 to release a UE context (S310). After handover (i.e. PCell change for MCG or PSCell change for SCG), the UE 10 transmits and receives data to/from the target gNB 30 (S312). The target gNB 30 can re-configure RRC configuration to the UE 10, if needed (S311).

The RRC messages showed in FIG. 3 may be transferred as a part of the handover process via SRB1. The size of the RRCReconfiguration message can be defined as X bytes while the size of RRCReconfigurationComplete is about 2 bytes.

Based on the RRC configuration for the target cell 30, the size of the RRCReconfiguration message could be hundreds of bytes, which is variable. The RRCReconfigurationComplete message is also of a variable size but is generally around 2 bytes.

Figure 4:
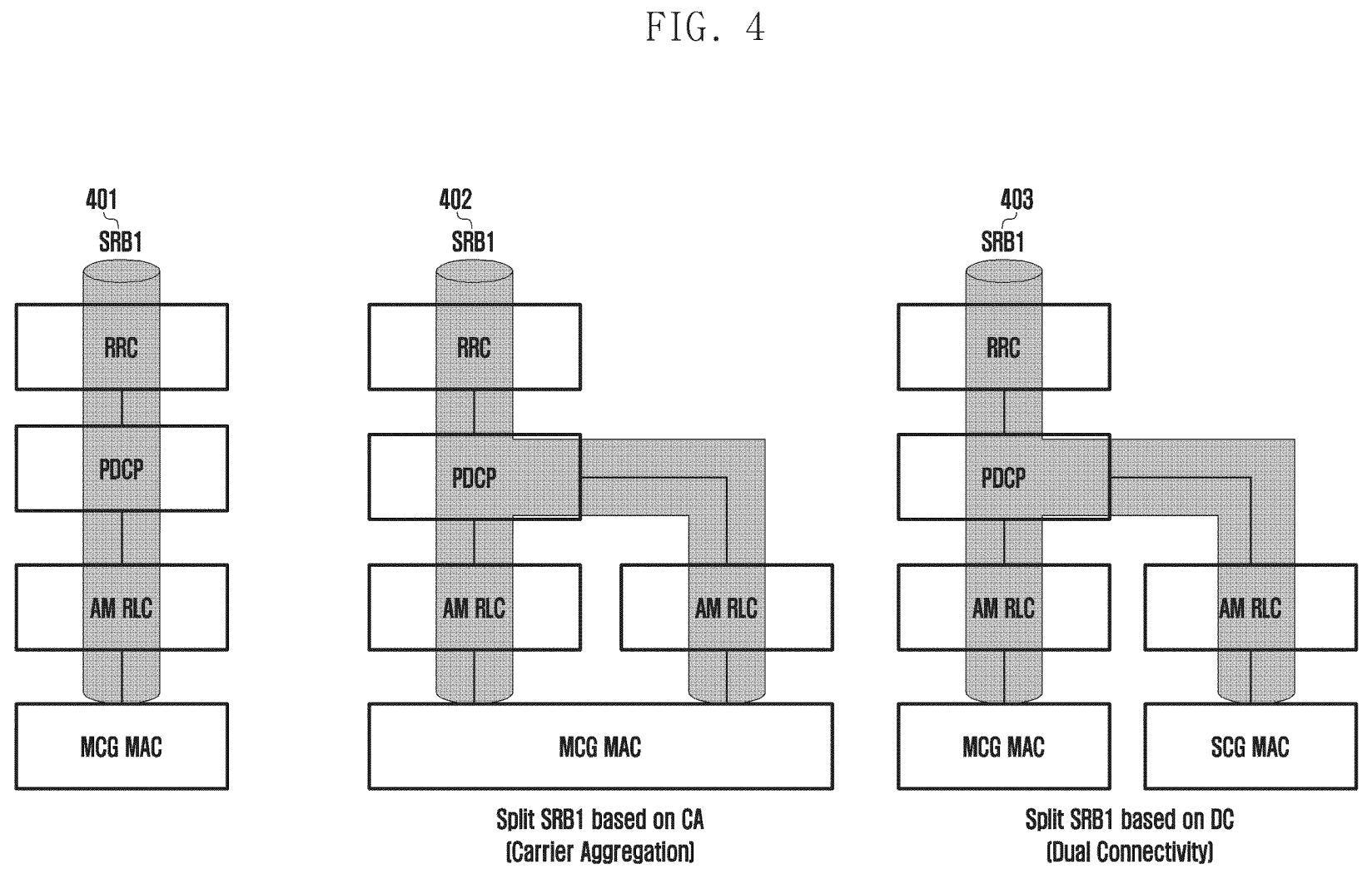

FIG. 4 illustrates a configuration of SRB1 according to an embodiment.

In FIG. 4, when RRCReconfiguration is sent (S304) to UE 10 via a first SRB1, the first SRB1 can be configured, according to the specific configuration in place, as one of SRB1401, split SRB1 402 based on carrier aggregation, or split SRB1 403 based on DC.

Figure 5:
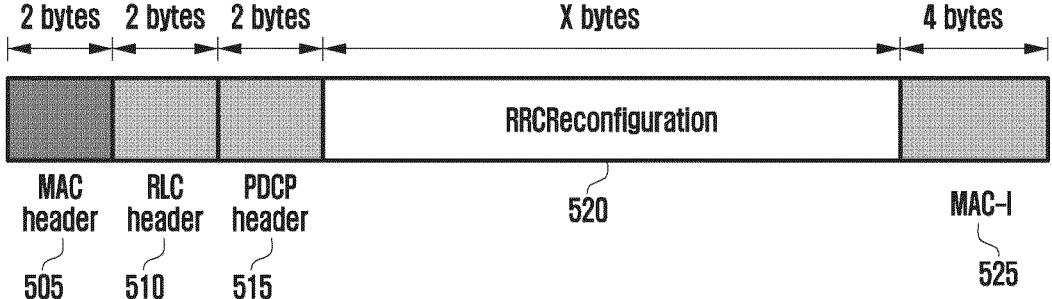
FIG. 5 illustrates an RRC message configuration according to an embodiment.

FIG. 5 illustrates an RRC message configuration according to an embodiment.

In FIG. 5, the first MAC PDU to be transmitted via SRB 1 may include at least one of the RRC message (e.g. RRCReconfiguration) 520, PDCP header 515, MAC-I 525, RLC header 510, and MAC header 505. As an example, the size of the headers and MAC-I 525 may be 4 bytes, but is not limited thereto. The MAC-I 525 is the message authentication code for integrity, which is generated and processed in the PDCP entity.

If the RRC message to be transmitted is RRCReconfiguration 520 and the transmitted data has the format and structure of the first MAC PDU, its size would be 10+X bytes (2+2+2+X+4 bytes).

Figure 6:
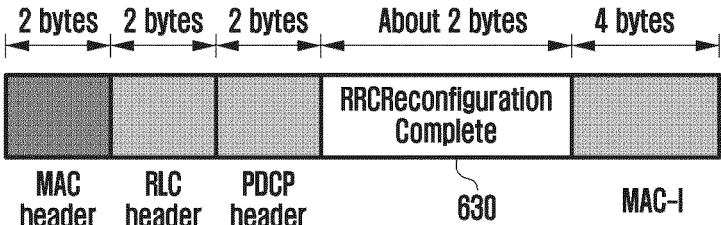
FIG. 6 illustrates an RRC message configuration according to an embodiment.

FIG. 6 illustrates an RRC message configuration according to an embodiment.

In FIG. 6, if the RRC message to be transmitted is RRCReconfigurationComplete 630 and the transmitted data has the format and structure of the first MAC PDU, its size would be 12 bytes (2+2+2+2+4 bytes). In this case, the total message includes quite a large overhead, relative to the actual data, which is only about 2 bytes.

Figure 7:
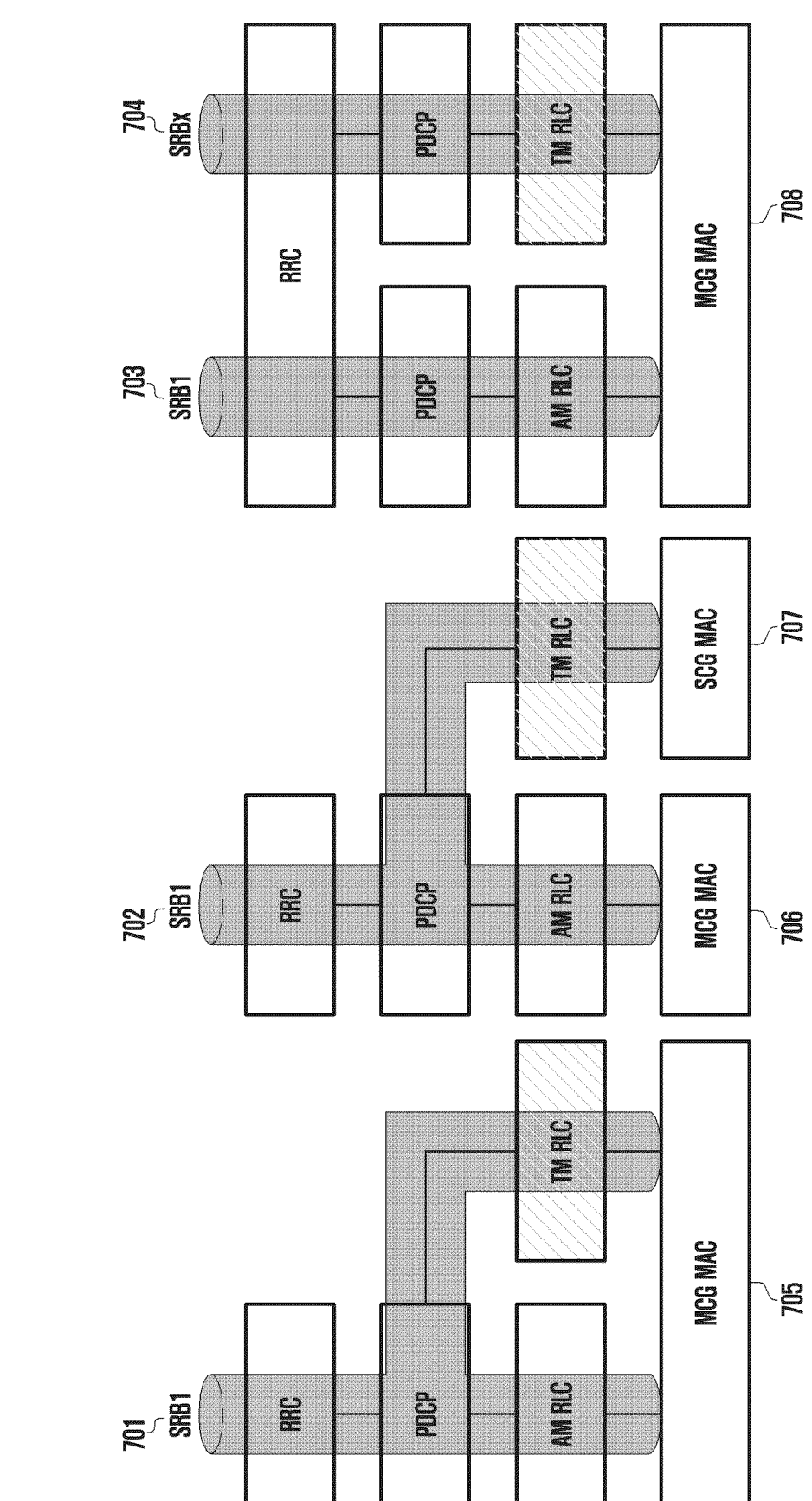
FIG. 7 illustrates a configuration of SRB according to an embodiment.

FIG. 7 illustrates a configuration of SRB according to an embodiment.

In FIG. 7, for an SRB (SRB1 or SRB2 or SRB3 or SRBx), various SRB configuration(s) may be provided via dedicated RRC signalling. As a non-restrictive example, the gNB may provide to the UE:

an SRB1 701 with two RLC entities for MCG MAC 705, where one AM RLC entity for reliable transmission and the TM RLC entity for RRC message transmission with reduced overhead (i.e., split SRB for coverage enhancement with overhead reduction);

an SRB1 702 with one AM RLC entity for MCG MAC 706 for reliable transmission and one TM RLC entity for SCG MAC 707 for RRC message transmission with reduced overhead (i.e., split SRB for DC); and for MCG MAC 708, an SRB1 703 with AM RLC entity configuration for reliable transmission and an SRBx 704 with TM RLC entity configuration for RRC message transmission with reduced overhead.

For other examples, the gNB may also provide an SRB with UM RLC entity configuration for RRC message transmission with reduced latency, an SRB with two AM RLC entities, where one AM RLC entity for one cell and the other AM RLC entity for the other cell (i.e. split SRB for CA, which can be used for packet duplication to enhance the reliability), or an SRB with two RLC entities, one AM RLC entity for reliable transmission and the UM RLC entity for RRC message transmission with reduced latency. Here, one AM RLC entity can be configured for the source cell and the other TM RLC entity can configured be for the target cell, one TM RLC entity can be configured for the source cell and the other AM RLC entity can be configured for the target cell, the AM RLC entity and the other TM RLC entity can be configured for the target cell, or the AM RLC entity and the other TM RLC entity can be configured for the source cell.

The network can configure a second SRB with two RLC entities, one AM RLC entity for reliable transmission and the TM RLC entity for RRC message transmission with reduced overhead or the second SRB with TM RLC entity configuration for RRC message transmission with reduced overhead, which can be configured by RRCReconfiguration message before RRCReconfiguration with reconfiguration-WithSync indicating handover (in this case, the overhead can be reduced for both RRCReconfiguration and RRCReconfigurationComplete message) or by RRCReconfiguration message with reconfigurationWithSync indicating handover (in this case, the overhead can be reduced only for RRCReconfigurationComplete message as UE will send this message the target cell. The coverage towards the target cell will be enhanced).

The second MAC PDU to be transmitted via SRB1 includes the RRC message (e.g. RRCReconfiguration or RRCReconfigurationComplete), PDCP header, MAC-I, and MAC header, and the second SRB1 can be configured with a PDCP entity associated with an AM RLC entity and a TM RLC entity or a separate SRBx 704 with TM RLC as shown in FIG. 7. The second MAC PDU can be transmitted and received (i.e. processed) via the TM RLC leg of the second SRB1 when the second SRB1 is configured. The TM RLC entity does not process the received data, i.e., does not generate an RLC header.

Figure 8:
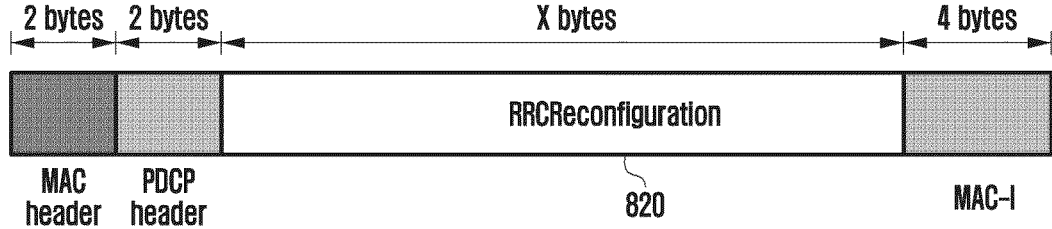
FIG. 8 illustrates an RRC message configuration according to an embodiment.
Figure 8:
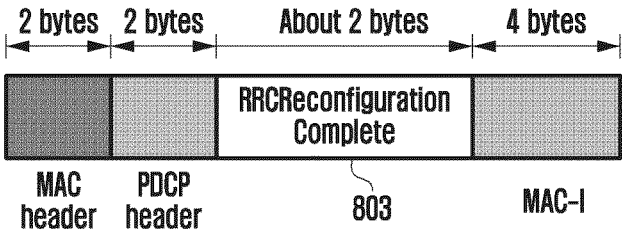

FIG. 8 illustrates an RRC message configuration according to an embodiment.

In FIG. 8, if the RRC message to be transmitted is the RRCReconfiguration message 820 and the transmitted data has the format and structure of the second MAC PDU, the size of the RRC message would be 8+X bytes (2+2+X+4 bytes), i.e., the size is reduced by 2 bytes compared to the previous example illustrated in FIG. 5. As the size decreases, the coverage increases.

However, if the RRC message to be transmitted is the RRCReconfigurationComplete message 830 and the transmitted data has the format and structure of the second MAC PDU, its size would be 10 bytes (2+2+2+4 bytes), i.e., the size is reduced by 2 bytes compared to the previous example illustrated in FIG. 6. As the size decreases, the coverage increases.

Figure 9:
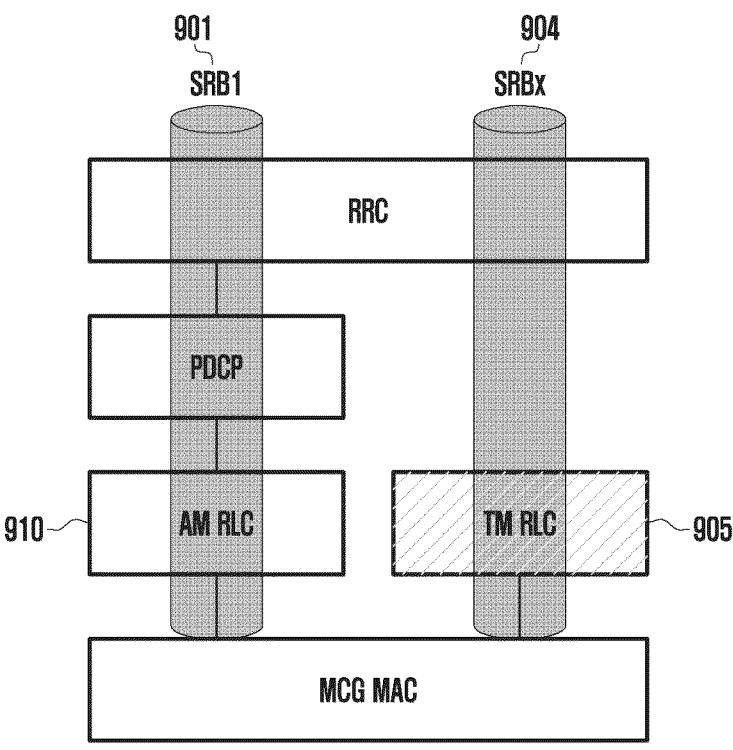
FIG. 9 illustrates a configuration of SRB according to an embodiment.

FIG. 9 illustrates a configuration of an SRB according to an embodiment.

In FIG. 9, the network can configure an SRB1 with one AM RLC entity for reliable transmission and a third SRB with one TM RLC entity for RRC message transmission with reduced overhead, which can be configured by RRCReconfiguration message before RRCReconfiguration with reconfigurationWithSync indicating handover (in this case, the overhead can be reduced for both RRCReconfiguration and RRCReconfigurationComplete message) or by RRCReconfiguration message with reconfigurationWith-Sync indicating handover (in this case, the overhead can be reduced only for RRCReconfigurationComplete message as UE will send this message to the target cell. The coverage towards the target cell will be enhanced).

The third MAC PDU to be transmitted includes the RRC message (e.g. RRCReconfiguration or RRCReconfigurationComplete), MAC header and a new field (e.g. MAC-I in MAC entity or digital signature) and the third SRB1 can be configured with a TM RLC entity 905 as a supplementary SRB1 or a new SRBx 904 as shown in FIG. 9.

Figure 10:
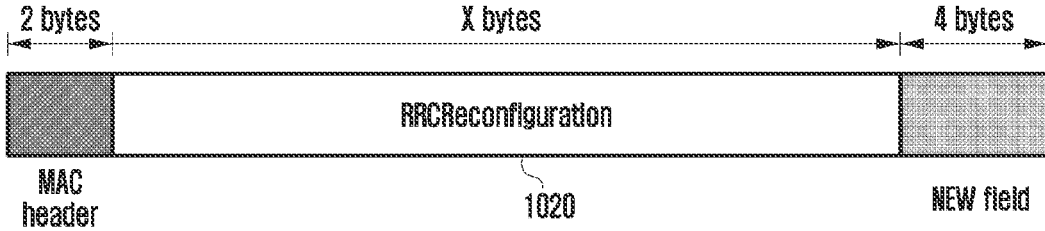
FIG. 10 illustrates an RRC message configuration according to an embodiment.
Figure 10:
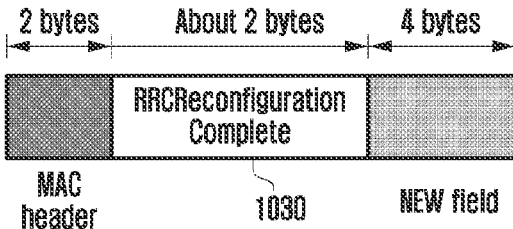

FIG. 10 illustrates an RRC message configuration according to an embodiment.

In FIG. 10, if the RRC message to be transmitted is RRCReconfiguration 1020 and the transmitted data has the format and structure of the third MAC PDU, its size would be 6+X bytes (2+X+4 bytes), i.e., the size is reduced by 4 bytes compared to the previous example illustrated in FIG. 5.

However, if the RRC message to be transmitted is RRCReconfigurationComplete 1030 and the transmitted data has the format and structure of the third MAC PDU, its size would be 8 bytes (2+2+4 bytes) as shown in FIG. 10, i.e., the size is reduced by 4 bytes compared to the previous example illustrated in FIG. 6.

The MAC entity performs integrity protection and integrity verification for the third MAC PDU with a new field, as shown FIG. 10. The indicator in the MAC header may indicate whether it is integrity protected (or ciphered) or not (e.g. special LCID). The third MAC PDU can be processed via the third SRB1 when the third SRB1 is configured. As an example, the size of the headers and MAC-I can be assumed as shown in FIG. 10.

Figure 11:
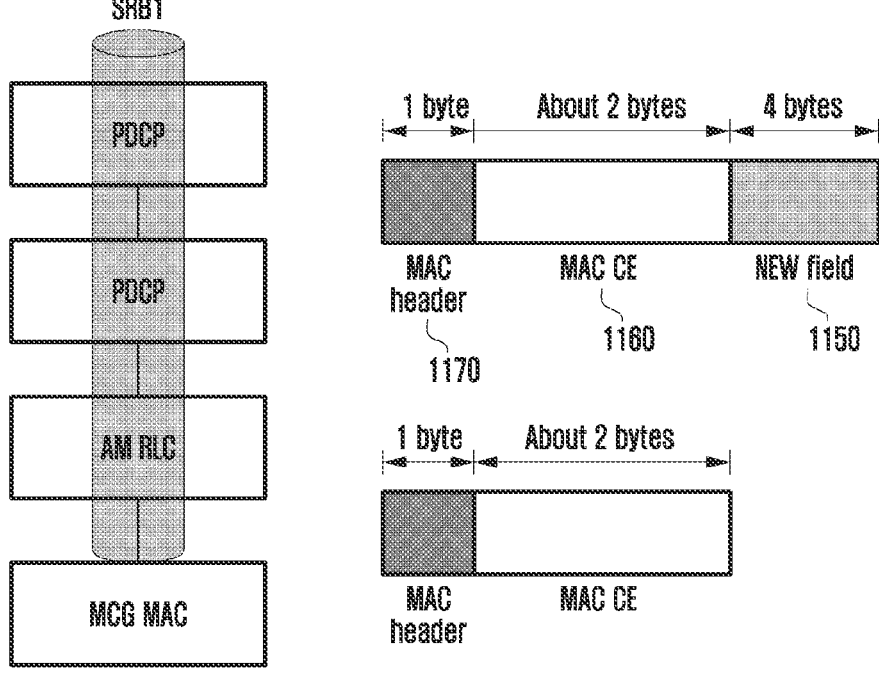
FIG. 11 illustrates a configuration of SRB according to an embodiment of the present disclosure and an associated message configuration.

FIG. 11 illustrates a configuration of an SRB according to an embodiment.

In FIG. 11, the fourth MAC PDU to be transmitted for PCell change can be defined as a MAC CE 1160 triggering (or indicating) PCell change with an identity (or index) for the target cell or the fourth MAC PDU can include the MAC CE 1160. Similarly, a UE can send a HARQ ACK of the MAC CE 1160 or send a MAC CE acknowledging the PCell change to the network.

The fourth MAC PDU (i.e. the MAC CE 1160 indicating PCell change) can replace RRCReconfiguration or RRCReconfigurationComplete to reduce the overhead and enhance the coverage as the size of RRC message is much larger than the size of MAC CE.

In FIG. 11, the network can send a UE the MAC CE 1160 with an indicator indicating the target cell (or the target cell configuration) for PCell change, instead of transmitting RRCReconfiguration message with reconfigurationiWith-Sync indicating PCell change. The target cell identity or target cell configuration indicated by the MAC CE 1160 can be (pre-) configured (e.g. by RRCReconfiguration message) via an SRB1 before the transmission of the MAC CE 1160.

When UE receives the MAC CE 1160 with an indicator indicating the target cell (or the target cell configuration), UE applies the indicated target cell configuration and performs PCell change (i.e., cell switch procedure). UE can also indicate the MAC layer's reception of the MAC CE 1160 (or the execution of Pcell change) to the RRC layer so the RRC layer can apply the target cell configuration or generate RRCReconfigurationComplete message.

The cell switch procedure includes the random access procedure towards the target cell triggered by the UE. If a time alignment timer is not running for the target cell or a timing advance value (TA value) for the target cell is not valid or the timing advance value for the target cell is not indicated in the MAC CE 1160, UE can perform a random access procedure towards the target cell to get a valid TA value. During the random access procedure, UE can transmit RRCReconfigurationComplete message to the target cell.

If a time alignment timer is running for the target cell or a timing advance value (TA value) for the target cell is valid or the timing advance value for the target cell is indicated in the MAC CE 1160, UE does not trigger a random access procedure (i.e. skip the random access procedure) and UE can transmit RRCReconfigurationComplete message by using available radio resources (e.g. configured grant or PDCCH-indicated resources from the target cell).

In this manner, the network can transmit the MAC CE 1160 to UE to trigger a Pcell change with reduced overhead (i.e. for coverage enhancement and fast control message processing (as the MAC CE is very small)) and UE can complete the Pcell change by sending RRCReconfiguration-Complete message to the target cell.

In FIG. 11, the fourth MAC PDU can be protected by integrity protection (or ciphering) and integrity verification (or deciphering) performed by MAC entity with a new field 1150. The indicators in MAC header 1170 may indicate whether it is integrity protected (or ciphered) or not (e.g. special LCID) or whether to include the new field 1150.

The new field 1150 can be attached to the end of MAC PDU or located after MAC header or right after MAC CE. The fourth MAC PDU can be a security-protected MAC CE with the new field or a normal (non-security protected) MAC CE without the new field as shown in FIG. 11.

The new field 1150 can be defined as a new MAC-I in the MAC entity, which can be generated in the MAC entity (the transmitting MAC entity) and can be checked in the MAC entity (the receiving MAC entity).

The new field 1150 can re-use MAC-I of PDCP entity, i.e., the PDCP entity can generate MAC-I for MAC.

If the PCell change is triggered by the fourth MAC PDU, its size would be around 3 bytes, i.e., the size is significantly reduced but its reconfiguration is very limited.

However, if the fourth MAC PDU replaces RRCReconfigurationComplete, its size would be around 3 bytes, i.e., the size is significantly reduced.

Figure 12:
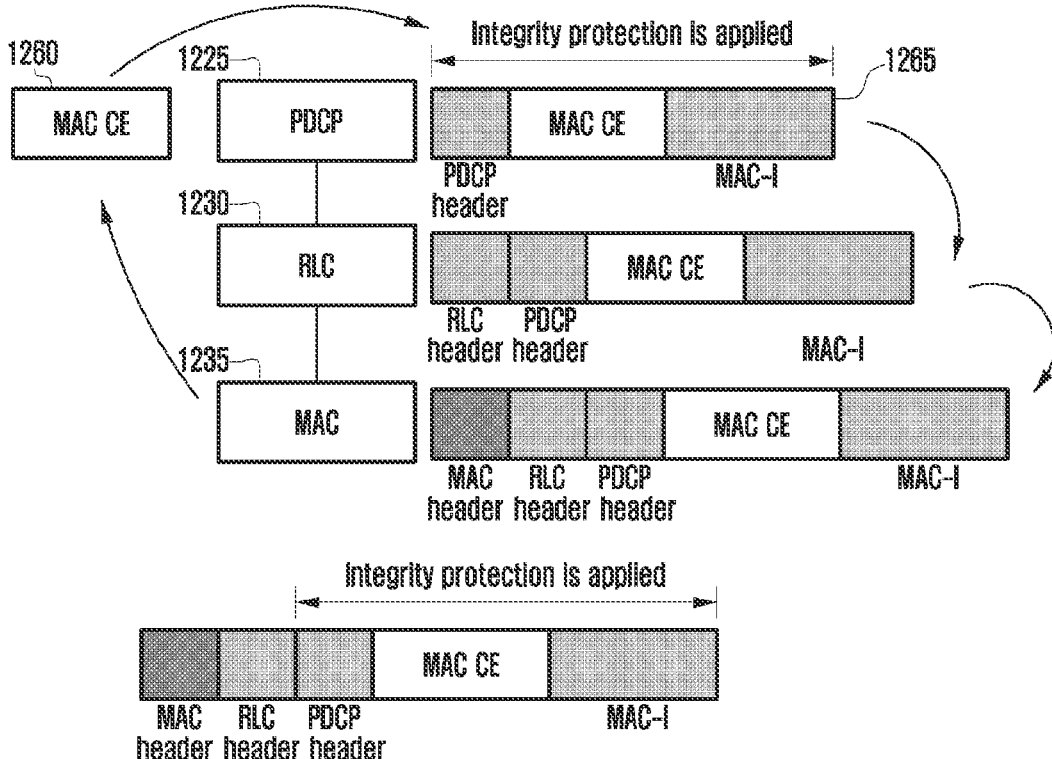
FIG. 12 illustrates a MAC PDU structure according to an embodiment.

FIG. 12 illustrates a MAC PDU structure according to an embodiment.

In FIG. 12, the new field can re-use MAC-I 1265 of PDCP entity, i.e., the transmitting PDCP 1225 entity can generate MAC-I 1265 for the MAC CE 1260 by performing the integrity protection for the PDCP header or MAC CE while the receiving PDCP entity can perform integrity verification for MAC-I 1265 for the MAC CE or PDCP header, i.e., calculate X-MAC and match X-MAC to MAC-I 1265 and then check the integrity verification failure. This approach can reuse the legacy mechanism and minimize the implementation impact because the size of the MAC CE is very small and thus the processing delay would be marginal.

When the integrity protection and verification mechanism in PDCP is reused (i.e. MAC-I is used as the new field), the first process can be as shown in FIG. 12.

A special SRB (or DRB or radio bearer) can be configured for MAC CE integrity protection and verification. (The ciphering or deciphering can be applied in the same manner, if configured).

The MAC entity 1235 generates the MAC CE 1260 and delivers it to the PDCP 1225 of the special DRB. The COUNT, DRB ID, Security Key etc for integrity protection can be applied as per a normal DRB.

The PDCP 1225 entity applies the integrity protection for the MAC CE 1260 and then submits it to the lower layer as normal data. The PDCP header is generated, and the integrity protection is applied to PDCP header or MAC CE 1260. After that, MAC-I 1265 is generated and attached to the end of MAC CE 1260 as shown in FIG. 12. In the RLC 1230 entity, the RLC header is generated and attached to the front of RLC SDU. The RLC 1230 entity can be configured with AM mode for reliable transmission (by ARQ). UM mode can be configurable for the RLC 1260 entity. The MAC 1235 entity generates the MAC header, attaches it to a MAC SDU, and then submits the MAC PDU.

The receiving MAC/RLC/PDCP entity can handle the MAC PDU or the MAC CE 1260 as normal data.

Figure 13:
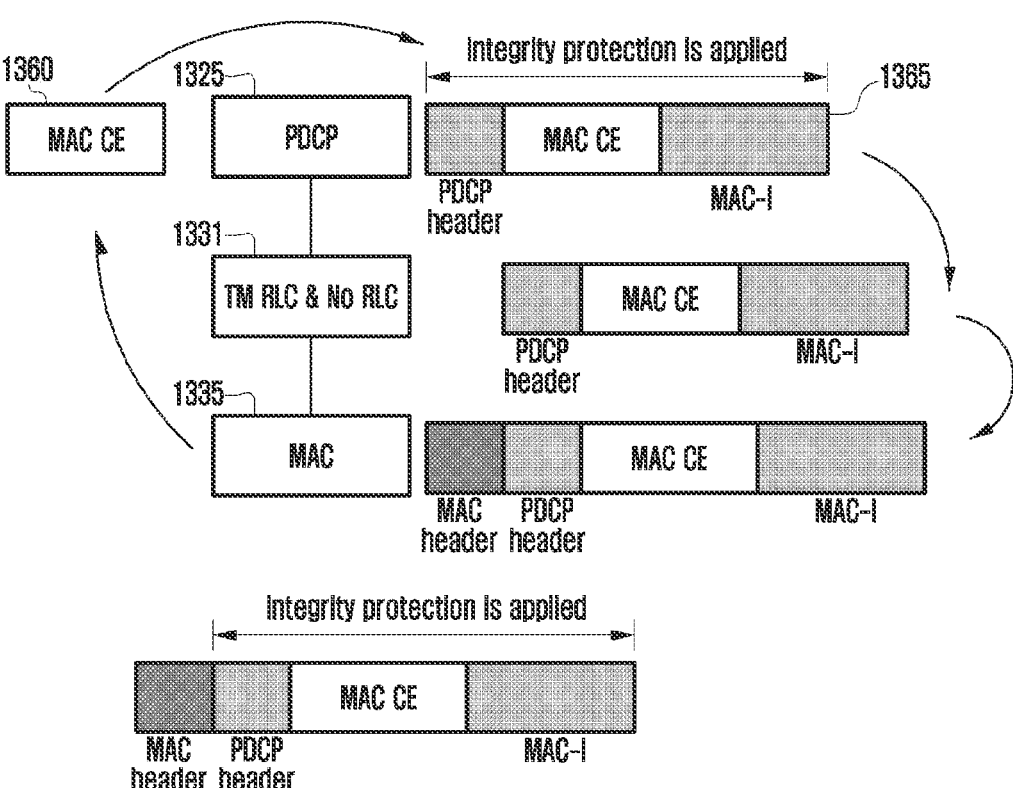
FIG. 13 illustrates a MAC PDU structure according to an embodiment.

However, when the integrity protection and verification mechanism in PDCP is reused (i.e. MAC-I is used as the new field), the second process can be as shown in FIG. 13.

FIG. 13 illustrates a MAC PDU structure according to an embodiment; and

A special SRB (or DRB or radio bearer) can be configured for MAC CE integrity protection and verification. The ciphering or deciphering can be applied in the same manner, if configured.

The MAC 1335 entity generates the MAC CE 1360 and delivers it to the PDCP 1325 of the special DRB. The COUNT, DRB ID, Security Key etc for integrity protection can be applied as per a normal DRB.

The PDCP 1325 entity applies the integrity protection for the MAC CE 1360 and then submits the MAC CE 1360 to the lower layers as normal data. The PDCP header is generated, and the integrity protection is applied to PDCP header or MAC CE 1360. After that, MAC-I 1365 is generated and attached to the end of MAC CE 1360 as shown in FIG. 13. The RLC 1331 entity can be configured with TM mode to reduce overhead or may not be configured. The MAC 1335 entity generates the MAC header, attaches the MAC header to MAC SDU, and then submits the MAC PDU.

The receiving MAC/PDCP entity can handle the MAC PDU or the MAC CE 1360 as a normal data.

In another embodiment, the PDCP header can be omitted to further reduce the overhead.

Hereinafter, a signalling procedure of the UE 10, the source gNB 20, and the target gNB 30 to perform the above-described embodiment in the handover procedure will be described with reference to FIG. 3.

Solution 1

The source gNB 20 can determine whether UE 10 has the capability about the second SRB1 (or the second MAC PDU) or the third SRB1 (or the third MAC PDU) by UE information request and UE information response for UE capability.

The source gNB 20 can pre-configure the second SRB1 (or the third SRB1) to UE 10 by RRCReconfiguration (e.g. via SRB1) before sending handover command (e.g. RRCReconfiguration).

When the source gNB 20 determines a handover is required, the source gNB 20 (or Cell) can inquire whether the target gNB 30 (or Cell) has the capability of the second SRB1 (or the second MAC PDU) or the third SRB1 (or the third MAC PDU) via Xn message. The target gNB 30 can respond to this with an indication via Xn message. The Xn message is an inter-node message between gNBs.

After that, the source gNB 20 can send the handover command with the second MAC PDU (or the third MAC PDU) including RRCReconfiguration to the UE 10 via the second SRB1. When the UE 10 receives the handover command, the UE 10 can determine whether the configuration of the second SRB1 (or the third SRB1) or the second MAC PDU (or the third MAC PDU) for the target gNB 30 (or Cell) is configured in RRCReconfiguration. If configured, UE 10 configures the second SRB1 (or the third SRB1) for the target cell 30.

The UE 10 can check the availability of the second SRB1 (or the third SRB1) or the second MAC PDU (or the third MAC PDU) for the target gNB 30 (or Cell) in system information (broadcasted as indicator), and then the UE 10 can configure SRB1 for the target cell 30.

To complete handover, the UE 10 can send the second MAC PDU (or the third MAC PDU) including RRCReconfiguationComplete to the target gNB 30 via the second SRB1 (or the third SRB1), if configured. Otherwise, UE 10 can send the first MAC PDU including RRCReconfiguation-Complete to the target gNB 30 via the first SRB1. This transmission can be done as a part of the random access procedure (e.g., Message 3 transmission or HARQ ACK).

Solution 2

The source gNB 20 can determine whether UE 10 has the capability of the second SRB1 (or the second MAC PDU) or the third SRB1 (or the third MAC PDU) by UE Information Request and UE Information Response for UE Capability.

When the source gNB 20 determines a handover is required, the source gNB 20 (or Cell) can inquire whether the target gNB 30 (or Cell) has the capability of the second SRB1 (or the second MAC PDU) or the third SRB1 (or the third MAC PDU) via Xn message. The target gNB 30 can respond to this with an indication via Xn message, e.g. Yes or No (ACK or NACK).

After that, the source gNB 20 can send the handover command with the first MAC PDU including RRCReconfiguration to UE 10 via the first SRB1. When the UE 10 receives the handover command, UE 10 can determine whether the configuration about the second SRB1 (or the third SRB1) or the second MAC PDU (or the third MAC PDU) for the target gNB 30 (or Cell) is configured in RRCReconfiguration. If configured, UE 10 configures the second SRB1 (or the third SRB1) for the target cell 30.

In another embodiment, UE 10 can check the availability of the second SRB1 (or the third SRB1) or the second MAC PDU (or the third MAC PDU) for the target gNB 30 (or Cell) in system information (broadcasted as indicator), and then UE 10 can configure it for the target cell 30.

To complete handover, UE 10 can send the second MAC PDU (or the third MAC PDU) including RRCReconfiguationComplete to the target gNB 30 via the second SRB1 (or the third SRB1), if configured. Otherwise, UE 10 can send the first MAC PDU including RRCReconfiguationComplete to the target gNB 30 via the first SRB1. This transmission can be done as a part of the random access procedure (e.g., Message 3 transmission or HARQ ACK).

Solution 3

The source gNB 20 can determine whether UE 10 has the capability of the fourth MAC PDU by UE information request and UE information response for UE capability.

When the source gNB 20 determines a handover is required, the source gNB 20 (or Cell) can inquire whether the target gNB 30 (or Cell) has the capability of the fourth MAC PDU via Xn message. The target gNB 30 can respond to this with an indication via Xn message, e.g. Yes or No (ACK or NACK).

After that, the source gNB 20 can send the handover command with the fourth MAC PDU to UE 10. When the UE 10 receives the handover command, the UE can reply to the source cell 20 by sending a HARQ ACK or the fourth MAC PDU to the source cell 20, to notify the source cell 20 of the successful reception.

The UE 10 can reply to the target gNB 30 (or cell) by sending the fourth MAC PDU to the target cell 30, to notify the target cell 30 of the successful handover and complete the handover.

The UE 10 can check the availability of the fourth MAC PDU for the target gNB 30 (or Cell) in system information (broadcasted as indicator), and can use the fourth MAC PDU for the target cell 30.

To complete handover, the UE 10 can send the fourth MAC PDU (or the third MAC PDU) indicating handover completion to the target gNB 30 (or cell), if configured.

The UE 10 can perform a random access procedure to the target cell 30, to notify the target cell 30 of the successful handover and complete the handover, with the fourth MAC PDU (or the third MAC PDU). This transmission can be performed as a part of the random access procedure (e.g., Message 3 transmission or HARQ ACK).

The network may send the fourth MAC PDU indicating Pcell change with the new field (i.e. security-protected MAC CE) to the UE 10, while the UE 10 can respond to the fourth MAC PDU by sending a MAC PDU (or MAC CE) acknowledging the fourth MAC PDU without the new field (to the source cell 20 or the target cell 30) to reduce the size of transmitted MAC PDU.

Solution 4

The source gNB 20 can determine whether UE 10 has the capability of the fourth MAC PDU (i.e. MAC CE based PCell change functionality) by UE information request and UE information response for UE capability.

When the source gNB 20 determines a handover is required, the source gNB 20 (or Cell) can inquire whether the target gNB 30 (or Cell) has the capability of the fourth MAC PDU (i.e. MAC CE based PCell change functionality) via Xn message. The target gNB 30 can respond to this with an indication via Xn message, e.g. Yes or No (ACK or NACK).

After that, the source gNB 20 can send the MAC CE as the handover command (i.e. the fourth MAC PDU) to UE 10. When the UE 10 receives the MAC CE (i.e. the handover command), the UE 10 can reply to the source cell 20 by sending HARQ ACK to notify the source cell 20 of the successful reception.

Specifically, the source gNB 20 can send the UE 10 the MAC CE with an indicator of the target cell (or the target cell configuration) for PCell change, instead of transmitting RRCReconfiguration message with reconfigurationWith-Sync indicating PCell change. The target cell identity or target cell configuration indicated by the MAC CE can be (pre-) configured (e.g. by RRCReconfiguration message) via SRB1 before the transmission of the MAC CE. When the UE 10 receives the MAC CE with an indicator of the target cell (or the target cell configuration), the UE 10 applies the indicated target cell configuration and performs PCell change (i.e., cell switch procedure). The UE 10 can also indicate the MAC layer's reception of the MAC CE (or the execution of PCell change) to the RRC layer so the RRC layer can apply the target cell configuration or generate RRCReconfigurationComplete message.

The PCell switch procedure includes the random access procedure towards the target cell triggered by the UE. If a time alignment timer is not running for the target cell (i.e. time alignment between the UE and the network (i.e. the target cell)) in UL or a timing advance value (TA value) for the target cell is not valid or the timing advance value for the target cell is not indicated in the MAC CE, the UE can perform a random access procedure towards the target cell to receive a valid TA value. During the random access procedure, the UE can transmit RRCReconfigurationComplete message to the target cell. If a time alignment timer is running for the target cell or a timing advance value (TA value) for the target cell is valid or the timing advance value for the target cell is indicated in the MAC CE, the UE does not trigger a random access procedure (i.e. skip the random access procedure) and can transmit RRCReconfiguration-Complete message by using available radio resources (e.g. configured grants or PDCCH-indicated resources from the target cell). In this manner, the network can transmit the MAC CE to UE to trigger a PCell change with reduced overhead (i.e. for coverage enhancement and fast control message processing (as the overhead of MAC CE is minimal)) and the UE can complete the PCell change by sending RRCReconfigurationComplete message to the target cell.

In the legacy procedure, the source gNB transmits RRCReconfiguration with reconfigurationWithSync indicator to trigger a PCell change and UE completes the PCell change by sending the RRCReconfigurationComplete message to the target cell, which incurs more overhead and reduces the coverage.

As the size of RRC message is much larger than the size of MAC CE, the replacement of a large RRC message with a small MAC CE can be applied to the certain cases described herein.

The UE 10 can reply to the target gNB 30 (or cell) by sending the fourth MAC PDU (e.g. RRCReconfiguration-Complete message) to the target cell 30, to notify the target cell 30 of the successful handover and complete the handover.

The UE 10 can check the availability of the fourth MAC PDU (e.g. the MAC CE or MAC CE based PCell change functionality) for the target gNB 30 (or Cell) in system information (broadcasted as indicator), and then can use this PDU for the target cell 30.

To complete handover, the UE 10 can send the fourth MAC PDU (or the third MAC PDU) indicating handover completion (e.g. RRCReconfigurationComplete message or a newly defined MAC CE) to the target gNB 30 (or cell), if configured.

The UE 10 can perform a random access procedure to the target cell 30, to notify the target cell 30 of the successful handover and complete the handover, with the fourth MAC PDU (or the third MAC PDU). This transmission can be performed as a part of the random access procedure (e.g., Message 3 transmission or HARQ ACK).

The network may send the fourth MAC PDU indicating the Pcell change with the new field (i.e. security-protected MAC CE) to the UE 10 which can respond to the fourth MAC PDU by a MAC PDU (or MAC CE) acknowledging the fourth MAC PDU without the new field (to the source cell 20 or the target cell 30) to reduce the size of transmitted MAC PDU.

Further Technical Enhancements

When the second MAC PDU (or the second SRB1) or the third MAC PDU (or the third SRB1) or the fourth MAC PDU are applied to each of the aforementioned cases to reduce the size of actual transmitted MAC PDU, the number of HARQ retransmission for the MAC PDU can be configured with a large number (or infinity) to guarantee its successful delivery because TM RLC entity and MAC entity has no such functionality as ARQ, while ARQ mechanism of AM RLC entity can guarantee the successful delivery. In another embodiment, UE 10 or the network can keep HARQ retransmission for the MAC PDU until the HARQ ACK for the MAC PDU is received.

Further, if the HARQ retransmission fails (or the number of HARQ retransmission reaches the configured threshold or beyond it, or the HARQ NACK is received and HARQ ACK has not received for the MAC PDU) or the network (or UE or MAC entity) concludes that the successful delivery of the MAC PDU fails, the MAC entity can indicate this to the RRC layer so that the RRC layer sends the first MAC PDU via the first SRB1. A timer can be introduced to determine the successful delivery of the MAC PDU (the timer starts at the transmission of the second MAC PDU (or the third MAC PDU), stops upon the confirmation of successful delivery, and the RRC layer sends the first MAC PDU via the first SRB1 at the expiry of the timer).

Moreover, the network or the UE 10 should guarantee the successful delivery of the second MAC PDU (or the third MAC PDU or the fourth MAC PDU).

To enable the foregoing, a separate HARQ process, a HARQ identity, or HARQ parameters can be introduced.

Further Solutions

When the fourth MAC PDU is applied to each of the aforementioned cases to reduce the size of actual transmitted MAC PDU, the Integrity verification failure can be detected or can occur from the new field if the fourth MAC PDU is security protected and includes the new field (digital signature or MAC-I). Therefore, embodiments herein may handle integrity verification failure in a MAC entity.

If integrity verification fails or the new field is not successfully decoded or an error for the new field is detected in the MAC entity or PDCP entity, then the following options are available.

In option 1, the MAC entity detects and indicates it to an upper layer (e.g. RRC layer). Based on this indication, the RRC layer can perform RRC Re-establishment procedure.

In option 2, the MAC entity generates a new MAC CE (or HARQ NACK) indicating the integrity verification failure and sends it to the source cell 20 to let the source cell know about the failure (or the error). Based on this, the source cell 20 can perform retransmission of the fourth MAC PDU or generate a new fourth MAC PDU indicating a new Pcell change and send it to UE 10 or fallback to the normal handover (i.e. send the first MAC PDU via the first SRB1 for a new handover command).

In option 3, when the integrity protection and verification mechanism in PDCP is reused (i.e. MAC-I is used as the new field) and the first or second process is performed, the PDCP entity detects and indicates it to an upper layer (e.g. RRC layer). Based on this indication, the RRC layer can perform RRC Re-establishment procedure.

The aforementioned SRBs, MAC PDUs, and solutions may be applied to the following cases.

In case A, when the UE 10 performs SCG addition or change (i.e. PSCell change), e.g. SCG addition (PSCell addition) or intra-SCG change (Change to another cell of the same SCG) or inter-SCG change (Change to a cell of the different SCG); RRCReconfiguration, RRCReconfigurationComplete to the target cell.

In case B, when the UE 10 performs RRC Re-establishment according to one of many RRC Re-establishment cause; RRCReestablishmentRequest to the previous cell (or new cell), RRCReestablishment, RRCReestablishmentComplete.

Alternatively, newly defined RRC messages can be configured for the aforementioned cases.

The disclosed structure for SRB1 can be extended to other SRBs (SRB2 or SRB3 or SRB4) or can be defined as a new SRB (e.g. SRBx).

Figure 14:
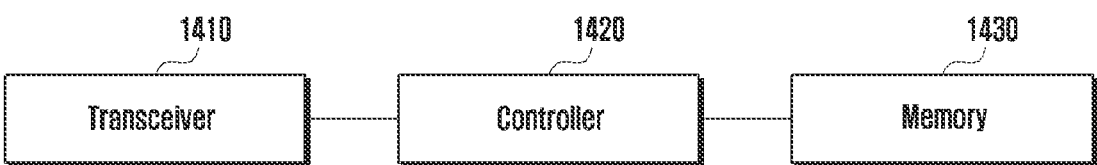
FIG. 14 illustrates a terminal according to an embodiment.

FIG. 14 is a terminal according to an embodiment.

Referring to FIG. 14, a terminal includes a transceiver 1410, a controller 1420 and a memory 1430. The controller 1420 may refer to a circuitry, an application-specific integrated circuit (ASIC), or at least one processor. The transceiver 1410, the controller 1420 and the memory 1430 are configured to perform the operations of the UE illustrated in the figures, e.g. FIGS. 1A to 12, or described above. Although the transceiver 1410, the controller 1420 and the memory 1430 are shown as separate entities, they may be realized as a single entity like a single chip. Alternatively, the transceiver 1410, the controller 1420 and the memory 1430 may be electrically connected to or coupled with each other.

The transceiver 1410 may transmit and receive signals to and from other network entities, e.g., a BS.

The controller 1420 may control the UE to perform functions according to one of the embodiments described above.

For example, the controller 1420 is configured to receive, via the transceiver 1410, a MAC PDU including a MAC control element (CE), the MAC CE indicating at least one target cell configuration, and perform a primary cell (PCell) change to a target cell based on the at least one target cell configuration.

The operations of the terminal may be implemented using the memory 1430 storing corresponding program codes. Specifically, the terminal may be equipped with the memory 1430 to store program codes implementing desired operations. To perform the desired operations, the controller 1420 may read and execute the program codes stored in the memory 1430 by using a processor or a central processing unit (CPU).

Figure 15:
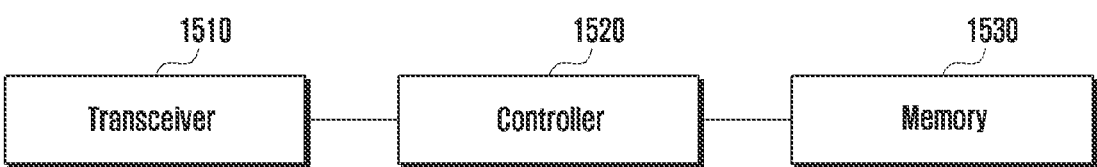
FIG. 15 illustrates a BS according to an embodiment.

FIG. 15 is a BS according to an embodiment of the disclosure.

Referring to FIG. 15, a BS includes a transceiver 1510, a controller 1520 and a memory 1530. The transceiver 1510, the controller 1520 and the memory 1530 are configured to perform the operations of the network (e.g., gNB) illustrated in the figures, e.g. FIGS. 1A to 12, or described above. Although the transceiver 1510, the controller 1520 and the memory 1530 are shown as separate entities, they may be realized as a single entity like a single chip. The transceiver 1510, the controller 1520 and the memory 1530 may be electrically connected to or coupled with each other.

The transceiver 1510 may transmit and receive signals to and from other network entities, e.g., a terminal.

The controller 1520 may control the BS to perform functions according to one of the embodiments described above. The controller 1520 may refer to a circuitry, an ASIC, or at least one processor.

For example, the controller 1520 is configured to a MAC PDU including a MAC CE indicating at least one target cell configuration, and transmit, via the transceiver 1510, the MAC PDU including the MAC CE. The at least one target cell configuration is associated with a primary cell (PCell) change to a target cell.

The operations of the BS may be implemented using the memory 1530 storing corresponding program codes. Specifically, the BS may be equipped with the memory 1530 to store program codes implementing desired operations. To perform the desired operations, the controller 1520 may read and execute the program codes stored in the memory 1530 by using a processor or a CPU.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that perform functions described in the flowchart. Because the computer program instructions may be loaded on a computer or a programmable data processing equipment, when executed as processes, they may perform operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

While the disclosure has been illustrated and described with reference to various embodiments of the present disclosure, those skilled in the art will understand that various changes can be made in form and detail without departing from the spirit and scope of the present disclosure as defined by the appended claims and their equivalents.

What is claimed is:

1. A method performed by a user equipment (UE) in a wireless communication system, the method comprising:
   receiving a medium access control (MAC) protocol data unit (PDU) including a MAC control element (CE), the MAC CE indicating at least one target cell configuration and a timing advance value; and
   performing a primary cell (PCell) change to a target cell based on the at least one target cell configuration; and
   based on the timing advance value being indicated by the MAC CE, transmitting a radio resource control (RRC) reconfiguration complete message to the target cell using a configured grant, while skipping a random access procedure towards the target cell.

2. The method of claim 1,
   wherein the MAC PDU further includes a MAC header that indicates whether a message authentication code for integrity (MAC-I) for the MAC CE is included in the MAC PDU.

3. The method of claim 2,
   wherein the MAC-I is determined by a MAC entity of the terminal.

4. The method of claim 2, further comprising performing, by a packet data convergence protocol (PDCP) entity of the terminal, an integrity verification for the MAC-I.

5. The method of claim 1, further comprising:
   receiving a UE information request message; and
   transmitting a UE information response message including capability information indicating whether the UE supports processing of the MAC PDU.

6. A method performed by a base station in a wireless communication system, the method comprising:
   generating a medium access control (MAC) protocol data unit (PDU) including a MAC control element (CE), the MAC CE indicating at least one target cell configuration and a timing advance value; and
   transmitting the MAC PDU including the MAC CE,
   wherein the at least one target cell configuration is associated with a target cell to which a primary cell (PCell) change is performed, and wherein the timing advance value indicated by the MAC CE is associated with a transmission of a radio resource control (RRC) reconfiguration complete message to the target cell using a configured grant, while a random access procedure towards the target cell is skipped.

7. The method of claim 6,
   wherein the MAC PDU further includes a MAC header that indicates whether a message authentication code for integrity (MAC-I) for the MAC CE is included in the MAC PDU.

8. The method of claim 7,
   wherein the MAC-I is generated by a MAC entity of the base station.

9. The method of claim 7,
   wherein the MAC-I is generated by a packet data convergence protocol (PDCP) entity of the base station.

10. The method of claim 6, further comprising:
    transmitting a UE information request message; and
    receiving a UE information response message including capability information indicating whether the UE supports processing of the MAC PDU.

11. A user equipment (UE) in a wireless communication system, the UE comprising:
    a transceiver; and
    a controller configured to:
       receive, via the transceiver, a medium access control (MAC) protocol data unit (PDU) including a MAC control element (CE), the MAC CE indicating at least one target cell configuration and a timing advance value,
       perform a primary cell (PCell) change to a target cell based on the at least one target cell configuration, and
       based on the timing advance value being indicated by the MAC CE, transmit, via the transceiver, a radio resource control (RRC) reconfiguration complete message to the target cell using a configured grant, while skipping a random access procedure towards the target cell.

12. The UE of claim 11,
    wherein the MAC PDU further includes a MAC header that indicates whether a message authentication code for integrity (MAC-I) for the MAC CE is included in the MAC PDU.

13. The UE of claim 12,
    wherein the MAC-I is determined by a MAC entity of the terminal.

14. The UE of claim 12,
    wherein the controller is further configured to perform, by a packet data convergence protocol (PDCP) entity of the terminal, an integrity verification for the MAC-I.

15. The UE of claim 11, wherein the controller is further configured to:
    receive, via the transceiver, a UE information request message, and
    transmit, via the transceiver, a UE information response message including capability information indicating whether the UE supports processing of the MAC PDU.

16. A base station in a wireless communication system, the base station comprising:
    a transceiver; and
    a controller configured to:
       generate a medium access control (MAC) protocol data unit (PDU) including a MAC control element (CE), the MAC CE indicating at least one target cell configuration and a timing advance value, and transmit, via the transceiver, the MAC PDU including the MAC CE, wherein the at least one target cell configuration is associated with a target cell to which a primary cell (PCell) change is performed, and wherein the timing advance value indicated by the MAC CE is associated with a transmission of a radio resource control (RRC) reconfiguration complete message to the target cell using a configured grant, while a random access procedure towards the target cell is skipped.

17. The base station of claim 16, wherein the MAC PDU further includes a MAC header that indicates whether a message authentication code for integrity (MAC-I) for the MAC CE is included in the MAC PDU.

18. The base station of claim 17, wherein the MAC-I is generated by a MAC entity of the base station.

19. The base station of claim 17, wherein the MAC-I is generated by a packet data convergence protocol (PDCP) entity of the base station.

20. The base station of claim 16, wherein the controller is further configured to:

transmit, via the transceiver, a UE information request message, and receive, via the transceiver, a UE information response message including capability information indicating whether the UE supports processing of the MAC PDU.

* * * * *